United States Patent
Lee et al.

(10) Patent No.: US 12,339,479 B2
(45) Date of Patent: Jun. 24, 2025

(54) POLARIZING PLATE AND OPTICAL DISPLAY APPARATUS COMPRISING THE SAME

(71) Applicant: SAMSUNG SDI CO., LTD., Yongin-si (KR)

(72) Inventors: Dae Gyu Lee, Suwon-si (KR); Jin Ah Seo, Suwon-si (KR); Hyun Ah Hong, Suwon-si (KR); Eun Hwa Lee, Suwon-si (KR); Jang Hyun Cho, Suwon-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 530 days.

(21) Appl. No.: 17/870,673

(22) Filed: Jul. 21, 2022

(65) Prior Publication Data
US 2023/0041225 A1 Feb. 9, 2023

(30) Foreign Application Priority Data
Jul. 23, 2021 (KR) .................. 10-2021-0097416

(51) Int. Cl.
*G02B 5/30* (2006.01)
*G02B 1/14* (2015.01)

(52) U.S. Cl.
CPC ............. *G02B 5/3008* (2013.01); *G02B 1/14* (2015.01)

(58) Field of Classification Search
CPC .......... G02B 5/3008; G02B 1/14; G02B 1/00; G02B 1/04; G02B 5/02; G02B 5/0205;
(Continued)

(56) References Cited

U.S. PATENT DOCUMENTS

2006/0014085 A1† 1/2006 Nakajima
2007/0030417 A1 2/2007 Kubo et al.
(Continued)

FOREIGN PATENT DOCUMENTS

CN 101675116 B 11/2012
CN 109642129 A 4/2019
(Continued)

OTHER PUBLICATIONS

Korean Office Action dated Jun. 24, 2024, issued in corresponding Korean Patent Application No. 10-2021-0097416 (6 pages).
(Continued)

*Primary Examiner* — Arnel C Lavarias
(74) *Attorney, Agent, or Firm* — Womble Bond Dickinson (US) LLP

(57) ABSTRACT

A polarizing plate and an optical display apparatus including the same are provided. A polarizing plate includes: a polarizer; and a first optically functional layer and a first protective layer sequentially stacked on a surface of the polarizer, and the optically functional layer includes a resin layer and acicular microparticles, the resin layer having a glass transition temperature (Tg) of $-70°$ C. to $-15°$ C. and a storage modulus of $1\times10^{-3}$ MPa to $9\times10^{-1}$ MPa at $25°$ C., and the acicular microparticles being oriented in an in-plane direction of the first optically functional layer, and, when a light absorption axis of the polarizer is $0°$, orientation angles of longitudinal directions of the acicular microparticles with respect to the light absorption axis of the polarizer have an average value of $-10°$ to $+10°$ and a standard deviation of $15°$ or less.

20 Claims, 7 Drawing Sheets

(58) Field of Classification Search
CPC .. G02B 5/0236; G02B 5/0242; G02B 5/0268;
G02B 5/0273; G02B 5/0278; G02B
5/3025; B32B 2264/00; B32B 2264/10
USPC ........... 359/493.01, 483.01, 487.01, 487.06,
359/487.05, 489.01, 489.06, 489.07,
359/489.15, 599, 601, 609, 613, 614;
362/19; 353/20; 428/221, 323, 325, 327,
428/330, 331, 332, 357, 364, 372, 397,
428/398, 399, 400, 401, 402
See application file for complete search history.

(56) References Cited

U.S. PATENT DOCUMENTS

| | | | |
|---|---|---|---|
| 2014/0362556 A1 | 12/2014 | Cho et al. | |
| 2015/0277011 A1* | 10/2015 | Nakamura | G02B 5/045 |
| | | | 359/489.07 |
| 2018/0067360 A1* | 3/2018 | Nakamura | G02B 5/045 |
| 2019/0211234 A1† | 7/2019 | Yamasaka | |
| 2020/0233146 A1† | 7/2020 | Yagi | |

FOREIGN PATENT DOCUMENTS

| | | |
|---|---|---|
| CN | 112513698 A | 3/2021 |
| JP | H 09-297204 A | 11/1997 |
| JP | 2010-250104 A | 11/2010 |
| KR | 10-2005-0074610 A | 7/2005 |
| KR | 10-2009-0123854 A | 12/2009 |
| KR | 10-2018-0047569 A | 5/2018 |
| KR | 10-2019-0040247 A | 4/2019 |
| TW | 200500739 | 1/2005 |
| TW | 200700475 | 1/2007 |
| TW | 201606355 A | 2/2016 |
| TW | 202100361 A | 1/2021 |

OTHER PUBLICATIONS

Taiwanese Office Action dated Dec. 19, 2023 issued in corresponding Taiwan Patent Application No. 111127489 (17 pages).
Taiwanese Office Action dated Apr. 26, 2023 issued in corresponding Taiwan Patent Application No. 111127489 (4 pages).

* cited by examiner
† cited by third party

POLARIZING PLATE AND OPTICAL DISPLAY APPARATUS COMPRISING THE SAME

CROSS-REFERENCE TO RELATED APPLICATION

This application claims priority to and the benefit of Korean Patent Application No. 10-2021-0097416, filed on Jul. 23, 2021 in the Korean Intellectual Property Office, the entire disclosure of which is incorporated herein by reference.

BACKGROUND

1. Field

Aspects of embodiments of the present invention relate to a polarizing plate and an optical display apparatus including the same.

2. Description of the Related Art

A liquid crystal display is operated by allowing light emitted from a backlight unit to propagate through a light source-side polarizing plate, a liquid crystal panel, and a viewer-side polarizing plate in the stated order. Light emitted from a light source is diffused through the backlight unit before entering the light source-side polarizing plate. Since diffused light passes through the light source-side polarizing plate, the liquid crystal panel, and the viewer-side polarizing plate, contrast of the liquid crystal display is decreased from the front of the liquid crystal display toward the lateral sides of the liquid crystal display.

In order to improve front and lateral contrast or visibility, incorporating a contrast or visibility-enhancing layer into the viewer-side polarizing plate has been considered. Such a contrast or visibility-enhancing layer may include a predetermined embossed or engraved optical pattern at the interface of a low-refractivity layer and a high-refractivity layer such that light transmitted through the viewer-side polarizing plate can be refracted by the optical pattern, thereby improving contrast or visibility.

However, the contrast or visibility-enhancing layer having such an optical pattern requires a pattern formation process. In addition, the contrast or visibility-enhancing layer is required to include two layers, that is, the low-refractivity layer and the high-refractivity layer. Generally, the pattern formation process employs a hard molding or soft molding technique, in which a pattern having a specific pitch is engraved on a patterning roll and transferred to a film. However, even a minor defect occurring on the patterning roll during the pattern formation process can be immediately reflected in the film to which the pattern is to be transferred, causing deterioration in manufacturability. This can result in the manufacturing process of the polarizing plate being complicated and costly, while making it difficult to reduce the thickness of the polarizing plate.

The background technique of the present invention is disclosed in Korean Patent Laid-open Publication No. 10-2018-0047569.

SUMMARY

According to an aspect of embodiments of the present invention, a polarizing plate that can improve contrast and/or brightness without requiring an optical pattern or a patterned layer including an optical pattern is provided.

According to another aspect of embodiments of the present invention, a polarizing plate that is easy to manufacture and is reduced in thickness by eliminating a need for an optical pattern or a patterned layer including an optical pattern is provided.

According to another aspect of embodiments of the present invention, a polarizing plate that includes an optically functional layer having good interlayer peel strength is provided.

Aspects of one or more embodiments of the present invention relate to a polarizing plate.

According to one or more embodiments, a polarizing plate includes: a polarizer; and a first optically functional layer and a first protective layer sequentially stacked on a surface of the polarizer, wherein the first optically functional layer includes a resin layer and acicular microparticles, the resin layer having a glass transition temperature (Tg) of $-70°$ C. to $-15°$ C. and a storage modulus of $1\times10^{-3}$ MPa to $9\times10^{-1}$ MPa at $25°$ C., and the acicular microparticles being oriented in an in-plane direction of the first optically functional layer, and, when a light absorption axis of the polarizer is $0°$, orientation angles of longitudinal directions of the acicular microparticles with respect to the light absorption axis of the polarizer have an average value of $-10°$ to $+10°$ and a standard deviation of $15°$ or less.

In one or more embodiments, the first optically functional layer may include a contrast or brightness-enhancing layer.

In one or more embodiments, the acicular microparticles may have an average aspect ratio of 5 to 60.

In one or more embodiments, the acicular microparticles may have a length of 10 μm to 30 μm and a diameter of 0.5 μm to 2 μm.

In one or more embodiments, the acicular microparticles may have a higher index of refraction than the resin layer.

In one or more embodiments, the acicular microparticles may include particles formed of at least one selected from among titanium oxide, zirconium oxide, zinc oxide, calcium carbonate, boehmite, aluminum borate, calcium silicate, magnesium sulfate, magnesium sulfate hydrate, potassium titanate, glass, and a synthetic resin.

In one or more embodiments, a surface of the acicular microparticles may be modified.

In one or more embodiments, the surface of the acicular microparticles may be modified with at least one selected from among a silane coupling agent, a surfactant, and oils.

In one or more embodiments, the acicular microparticles may be present in an amount of 1 wt % to 30 wt % in the first optically functional layer.

In one or more embodiments, the resin layer may be an adhesive layer.

In one or more embodiments, the resin layer may be formed of a composition including a non-birefringent resin.

In one or more embodiments, the resin may include at least one selected from among a (meth)acrylate resin and a polyester resin.

In one or more embodiments, the composition may further include a curing agent.

In one or more embodiments, the first optically functional layer may have a thickness of 100 μm or less.

In one or more embodiments, the first protective layer may include a retardation film.

In one or more embodiments, the first protective layer may further include a functional layer including at least one selected from among a hard coat layer, a scattering layer, a low reflectivity layer, an ultra-low reflectivity layer, a primer layer, a fingerprint-resistant layer, an antireflection layer, and an antiglare layer.

In one or more embodiments, the polarizing plate may further include a second optically functional layer between the first optically functional layer and the first protective layer.

In one or more embodiments, the second optically functional layer may include a resin layer and acicular microparticles.

In one or more embodiments, longitudinal directions of the acicular microparticles of the second optically functional layer may form an orientation angle of 85° to 95° with respect to the longitudinal directions of the acicular microparticles of the first optically functional layer.

Aspects of one or more embodiments of the present invention relate to an optical display apparatus.

According to one or more embodiments, an optical display apparatus includes a polarizing plate according to an embodiment of the present invention.

Embodiments of the present invention provide a polarizing plate that can improve contrast and/or brightness without requiring an optical pattern or a patterned layer including an optical pattern.

Further, embodiments of the present invention provide a polarizing plate that is easy to manufacture and is reduced in thickness by eliminating the need for an optical pattern or a patterned layer including an optical pattern.

Further, embodiments of the present invention provide a polarizing plate that includes an optically functional layer having good interlayer peel strength.

DETAILED DESCRIPTION

Figure 1:
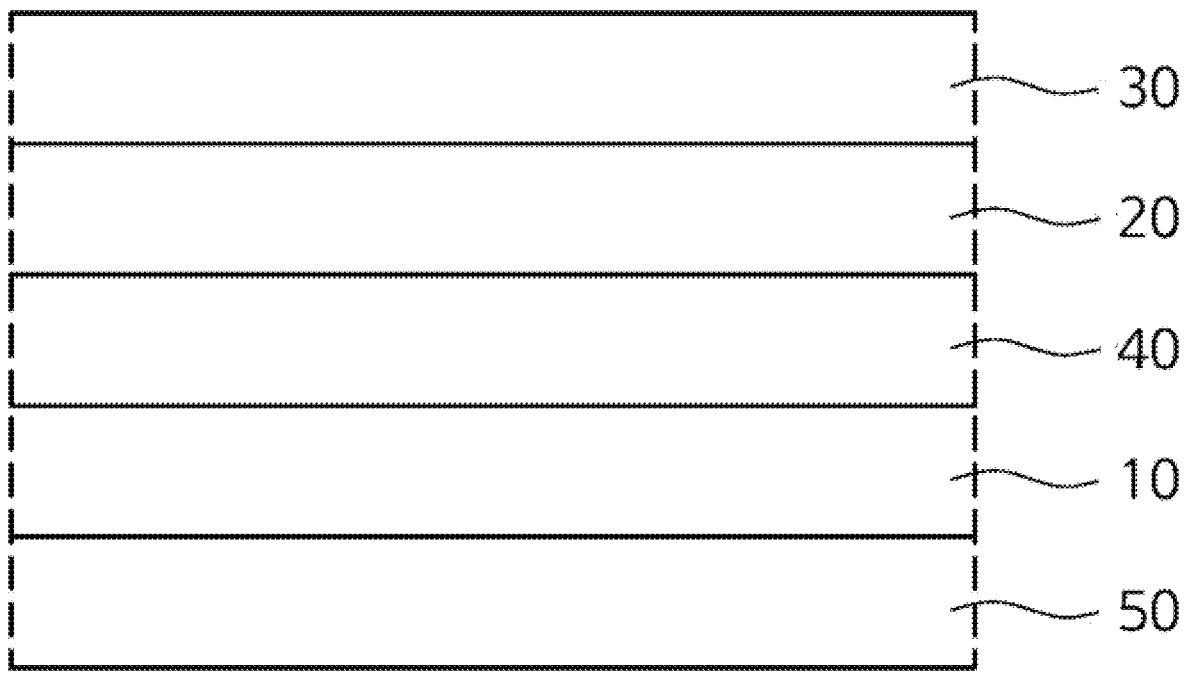
FIG. 1 is a cross-sectional view of a polarizing plate according to an embodiment of the present invention.

Herein, embodiments of the present invention will be described in further detail with reference to the accompanying drawings such that the present invention can be easily implemented by those skilled in the art. It is to be understood that the present invention may be embodied in different ways and is not limited to the following embodiments. In the drawings, portions irrelevant to the description may be omitted for clarity. Like components will be denoted by like reference numerals throughout the specification.

Herein, spatially relative terms, such as "upper" and "lower" are defined with reference to the accompanying drawings. Thus, it is to be understood that "upper surface" can be used interchangeably with "lower surface." In addition, when an element, such as a layer or film, is referred to as being placed "on" another element, it may be directly placed on the other element, or one or more intervening elements may be present. On the other hand, when an element is referred to as being placed "directly on" another element, there are no intervening element(s) therebetween.

Herein, "in-plane retardation (Re)" is a value measured at a wavelength of 550 nm, as calculated according to the following Equation A:

$$Re=(nx-ny)\times d,\qquad\text{Equation A}$$

where nx and ny are indexes of refraction of a protective layer, as measured in the slow axis- and fast axis-directions thereof at a wavelength of 550 nm, respectively, and d is a thickness (unit: nm) of the protective layer.

Herein, the term "(meth)acryl" refers to acryl and/or methacryl.

Herein, "index of refraction" may be a value measured at a wavelength of 380 nm to 780 nm, specifically 550 nm.

Herein, "modulus" of a resin layer refers to a storage modulus of the resin layer.

The storage modulus may be measured through the following procedure. First, a resin layer composition is applied to a release film to a post-drying thickness of 50 μm, followed by drying at 95° C. for 4 minutes, thereby forming a resin layer. Resin layers, formed as described above, are stacked one above another to a thickness of 500 μm and then cut into a circle with a diameter of 8 mm, thereby preparing a specimen. Storage modulus of the prepared specimen at 25° C. is measured under conditions of a heating rate of 10° C./min and a temperature range of 0° C. to 100° C. using a storage modulus measuring instrument (Advanced Rheometric Expansion System (ARES), TA Instruments).

As used herein to represent a specific numerical range, the expression "X to Y" means "≥X and ≤Y".

Embodiments of the present invention provide a polarizing plate which can improve front and lateral contrast and/or brightness without requiring an optical pattern or a patterned layer including an optical pattern. The polarizing plate according to embodiments of the present invention is easy to manufacture and is reduced in thickness by eliminating the need for an optical pattern or a patterned layer including an optical pattern. In addition, embodiments of the present invention provide a polarizing plate which includes an optically functional layer having good interlayer peel strength.

The polarizing plate according to one or more embodiments of the present invention includes: a polarizer; and a first optically functional layer and a first protective layer sequentially stacked on a surface of the polarizer, wherein the first optically functional layer includes a resin layer and acicular microparticles, the resin layer having a glass transition temperature (Tg) of $-70°$ C. to $-15°$ C. and a storage modulus of $1\times10^{-3}$ MPa to $9\times10^{-1}$ MPa at 25° C., and the acicular microparticles being oriented in an in-plane direction of the first optically functional layer, and, when a light absorption axis of the polarizer is 0°, orientation angles of longitudinal directions of the acicular microparticles with respect to the light absorption axis of the polarizer have an average value of $-10°$ to $+10°$ and a standard deviation of 15° or less.

Herein, a polarizing plate according to an embodiment of the present invention will be described with reference to FIG. 1. FIG. 1 is a cross-sectional view of a polarizing plate according to an embodiment.

Referring to FIG. 1, a polarizing plate may include a polarizer 10, a first protective layer 30, a first optically functional layer 20, a second protective layer 40, and a third protective layer 50.

A surface of the polarizer 10, particularly an upper surface of the polarizer 10, may be a light exit surface of the polarizer 10 with reference to internal light of an optical display apparatus to which the polarizing plate is applied. Accordingly, the first optically functional layer 20 and the first protective layer 30 may be stacked on the light exit surface of the polarizer 10 with reference to internal light of the optical display apparatus. However, it is to be understood that the present invention is not limited thereto and the first optically functional layer 20 may be stacked on a light entry surface of the polarizer 10 with reference to internal light of the optical display apparatus.

In an embodiment, the first optically functional layer 20 and the first protective layer 30 are stacked on the light exit surface of the polarizer with reference to internal light of the optical display apparatus. In this way, the effects of the present invention can be more easily achieved.

Herein, "internal light" refers to light emitted from a light source of a backlight unit and propagated through the polarizer.

First Optically Functional Layer

The first optically functional layer 20 of the polarizing plate may serve as a contrast and/or brightness-enhancing layer. In an embodiment, the first optically functional layer 20 serves as a contrast-enhancing layer.

In an embodiment, upper and lower surfaces of the first optically functional layer 20, that is, a light exit surface and a light entry surface of the first optically functional layer 20, are substantially totally flat and are not patterned, as shown in FIG. 1. Nevertheless, the first optically functional layer 20 can improve front and lateral contrast and/or brightness by containing acicular microparticles oriented in an in-plane direction of the first optically functional layer, wherein at least one of the acicular microparticles has a longitudinal direction forming an orientation angle of −10° to +10° with respect to a light absorption axis of the polarizer, and a standard deviation of the orientation angles of longitudinal directions of the acicular microparticles with respect to the light absorption axis of the polarizer has a value of 15° or less. Accordingly, the polarizing plate according to embodiments of the present invention is easy to manufacture and is reduced in thickness by eliminating the need for an optical pattern or a patterned layer.

Figure 2:
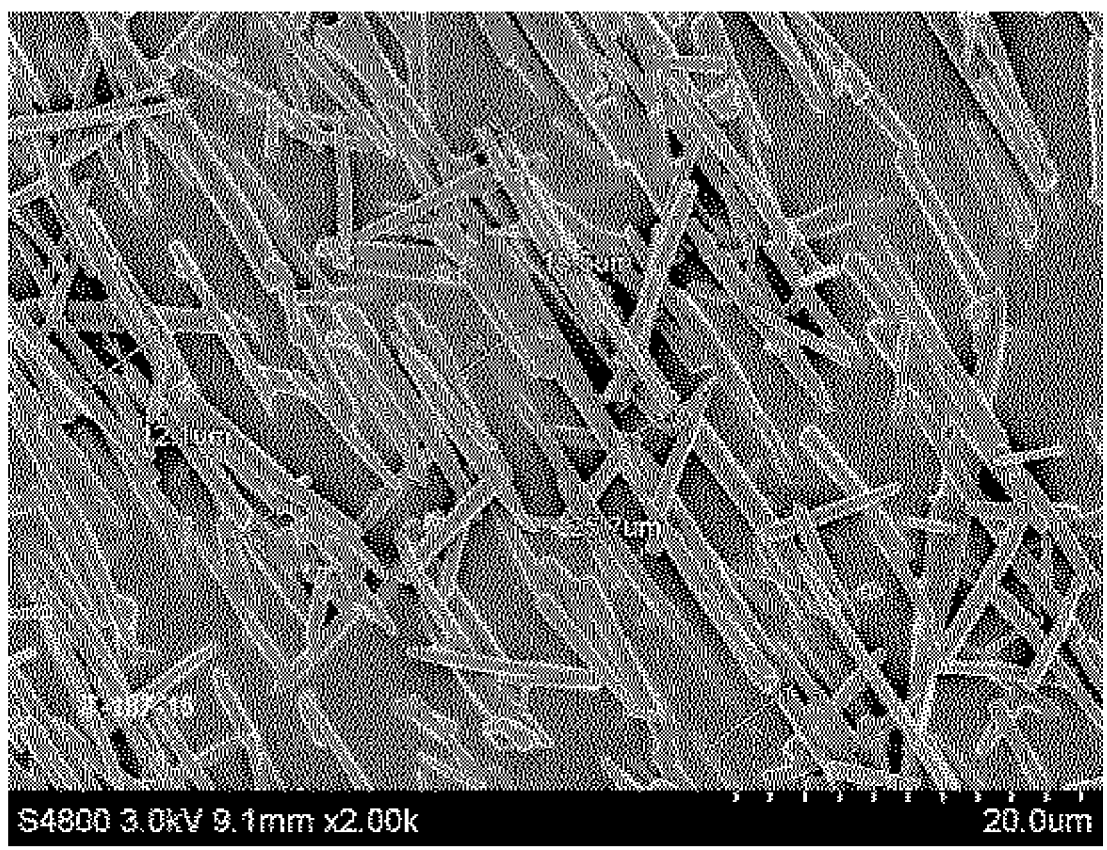
FIG. 2 is a TEM image of acicular microparticles according to an embodiment of the present invention.

FIG. 2 is a TEM image of acicular microparticles according to an embodiment of the present invention. Referring to FIG. 2, the acicular microparticles have a cross-section (e.g., a predetermined cross-section) and a length (e.g., a predetermined length). Next, the acicular microparticles will be described in further detail with reference to FIG. 3.

Figure 3:
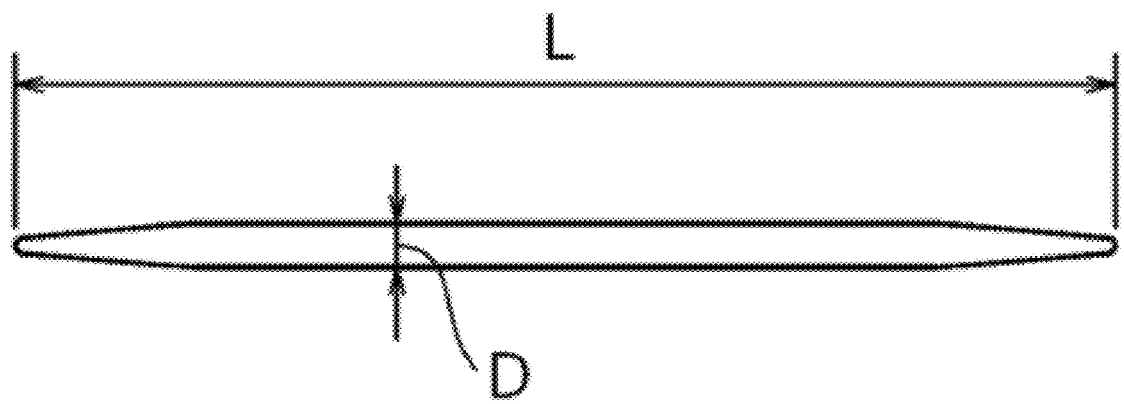
FIG. 3 is a longitudinal cross-sectional view of an acicular microparticle according to an embodiment of the present invention.

Referring to FIG. 3, in an embodiment, each of the acicular microparticles is a needle-like microparticle and has a length (e.g., a predetermined length) L and a diameter (e.g., a predetermined diameter) D, wherein the diameter D decreases toward both ends of the acicular microparticle, rather than being uniform across the length L. The acicular microparticle having a non-uniform thickness has optical anisotropy, whereby incoming light beams from the polarizer can be propagated in different directions upon passing through the acicular microparticle.

FIG. 3 shows an acicular microparticle decreasing in diameter toward both ends thereof. However, it is to be understood that the present invention is not limited thereto, and the acicular microparticles according to embodiments of the present invention may have a diameter that is uniform toward one end thereof while decreasing toward the other end thereof, depending, for example, on a method used to form the acicular microparticles.

The acicular microparticles may refer to microparticles having a micrometer-sized length. That is, the length L of the acicular microparticles is on the micrometer scale. Herein, the expression "having a micrometer-sized length" means that the length L of the acicular microparticles has a value of at least 1 μm. The acicular microparticles are easy to orient in the desired direction specified herein and thus can aid in improving contrast and brightness. By contrast, acicular nanoparticles which have a nanometer-sized length are not easy to orient in the desired direction, thus making it difficult to achieve the effects of the present invention.

In an embodiment, the length L of the acicular microparticles is in a range from 10 μm and 30 μm, and, in an embodiment, 15 μm to 28 μm. Within this range, the acicular microparticles can be easily oriented in the desired direction specified herein, thereby aiding in improving contrast and brightness.

In an embodiment, the diameter D of the acicular microparticles may be in a range from 0.5 μm and 2 μm, and, in an embodiment, 1 μm to 2 μm. Within this range, the acicular microparticles can provide lateral light diffusion due to an increase in aspect ratio thereof.

In an embodiment, the acicular microparticles may have an average aspect ratio of 5 to 60, and, in an embodiment, 5, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, 59, or 60, for example, 10 to 60. Within this range, the acicular microparticles can be effective in improving contrast and brightness. In an embodiment, the acicular microparticles have an average aspect ratio of 10 to 50.

Here, the "average aspect ratio" refers to an average of aspect ratio measurements of the acicular microparticles, and the term "aspect ratio" refers to a length-to-maximum diameter ratio of each of the acicular microparticles.

As described above, the acicular microparticles are oriented in the in-plane direction of the first optically functional layer, wherein, assuming that the light absorption axis of the polarizer is 0°, orientation angles of the acicular microparticles have an average value of −10° to +10° and a standard deviation of 15° or less, the orientation angles referring to angles of longitudinal directions of the acicular microparticles with respect to the light absorption axis of the polarizer.

The acicular microparticles are oriented at an orientation angle (e.g., a predetermined orientation angle) in the in-plane direction of the first optically functional layer. Here, the "orientation angle" refers to an angle of the longitudinal direction of the acicular microparticle with respect to the light absorption axis of the polarizer (0°). A spherical particle, which does not have a longitudinal direction, does not have an orientation angle.

According to embodiments of the present invention, since the orientation angles of the acicular microparticles have an average value of −10° to +10° and a standard deviation of 15° or less, incoming light beams from the polarizer can be propagated in different directions upon passing through the acicular microparticles, thereby improving front and lateral contrast and brightness. The light absorption axis of the polarizer may be a machine direction (MD) of the polarizer.

Next, the average and standard deviation of the orientation angles will be described with reference to FIG. 4 and FIG. 5.

Figure 4:
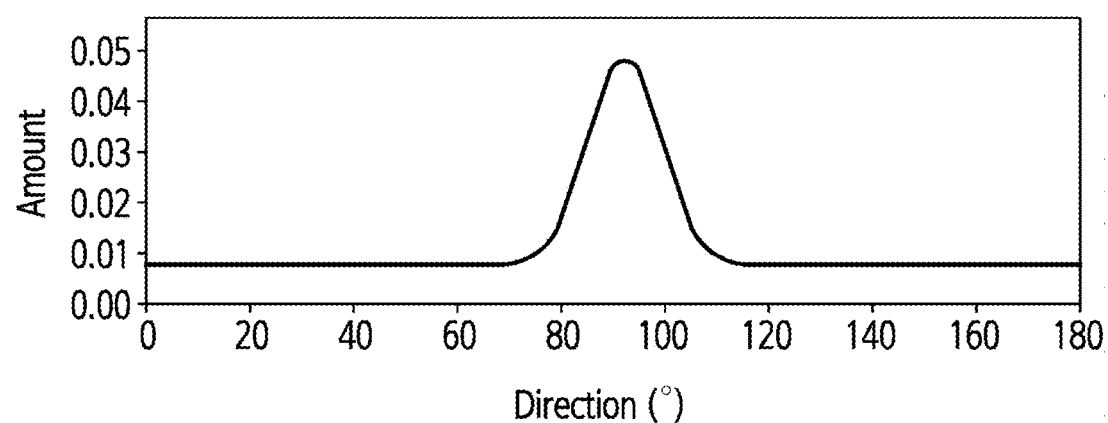
FIG. 4 is a schematic diagram showing a distribution of orientation angles of acicular microparticles in a resin layer according to an embodiment of the present invention with respect to a light absorption axis of a polarizer, the light absorption axis being 90°.
Figure 5A:
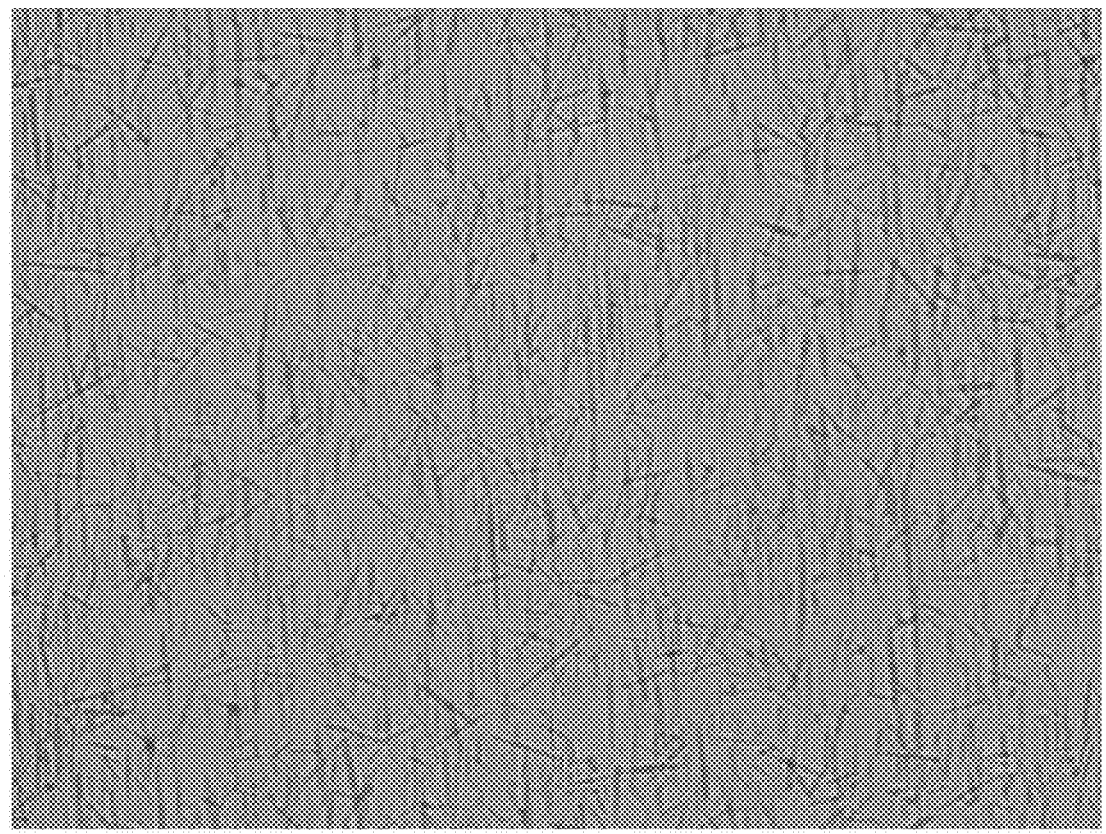
FIG. 5A is an image showing an orientation of acicular microparticles in a resin layer according to an embodiment.
Figure 5B:
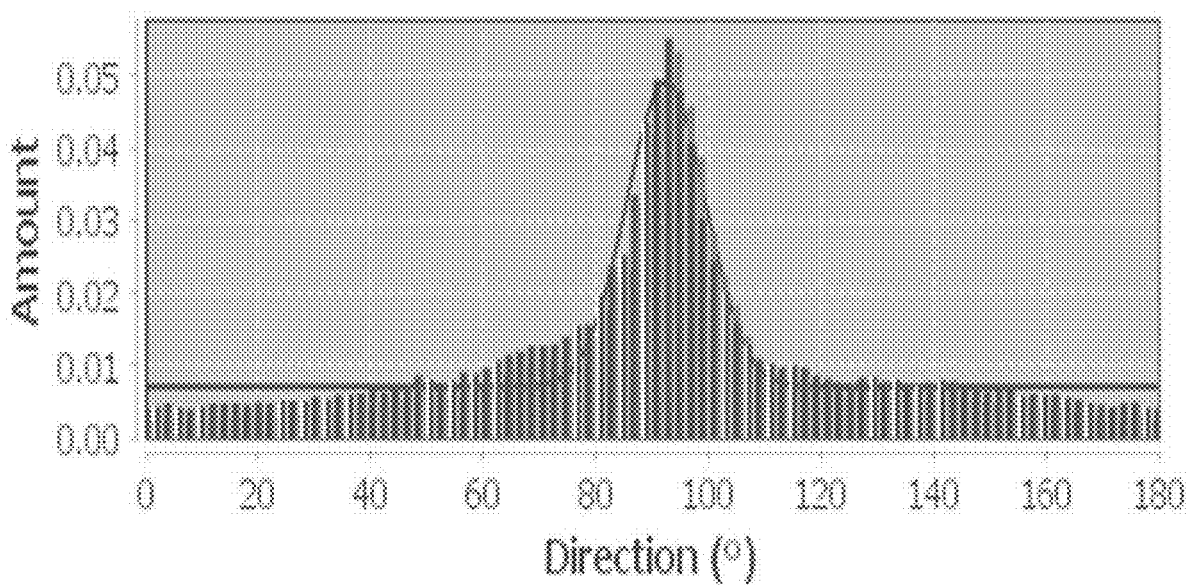
FIG. 5B is a diagram showing a distribution of measurements of orientation angles of the acicular microparticles with respect to the light absorption axis of the polarizer, the light absorption axis being 90°.

FIG. 4 is a schematic diagram showing a distribution of orientation angles of longitudinal directions of the acicular microparticles with respect to a reference when the optical light absorption axis of the polarizer is placed at an angle of 90° with respect to the reference. FIG. 5A is an image showing the orientation of the acicular microparticles in the first optically functional layer according to an embodiment of the present invention; and FIG. 5B is a diagram showing a distribution of measurements of the orientation angles of the longitudinal directions of the acicular microparticles in the first optically functional layer with respect to the reference.

An average of orientation angles of the acicular microparticles specified herein is obtained by calculating an average value of the measurements of the orientation angles, followed by subtracting 90° from the calculated average value. For example, when the calculated average value is 80°, the average value of the orientation angles is −10°, from which 90° is subtracted, and, when the calculated average value is 100°, the average of the orientation angles is +10°, from which 90° is subtracted. A standard deviation of the orientation angles may be calculated from the distribution of the measurements of the angles as shown in FIG. 5B by a typical method known in the art.

In an embodiment, the average value of the orientation angles may be −10°, −9.5°, −9°, −8.5°, −8°, −7.5°, −7°, −6.5°, −6°, −5.5°, −5°, −4.5°, −4°, −3.5°, −3°, −2.5°, −2°, −1.5°, −1°, −0.5°, 0, +0.5°, +1°, +1.5°, +2°, +2.5°, +3°, +3.5°, +4°, +4.5°, +5°, +5.5°, +6°, +6.5°, +7°, +7.5°, +8°, +8.5°, +9°, +9.5°, or +10°, for example, −4.0° to +4.0°. In an embodiment, the standard deviation of the orientation angles may be 0°, 0.5°, 1°, 1.5°, 2°, 2.5°, 3°, 3.5°, 4°, 4.5°, 5°, 5.5°, 6°, 6.5°, 7°, 7.5°, 8°, 8.5°, 9°, 9.5°, 10°, 10.5°, 11°, 11.5°, 12°, 12.5°, 13°, 13.5°, 14°, 14.5°, or 15°, and, in an embodiment, 0° to 8.5°, and, in an embodiment, 5° to 8.5°. Within these ranges, the polarizing plate can achieve the desired effects according to the present invention.

In an embodiment, at least 90%, for example, 95% to 100%, of the acicular microparticles may be oriented at an orientation angle of −10° and +10°. Within this range, the first optically functional layer can provide uniform or substantially uniform contrast and improved visibility.

In an embodiment, the acicular microparticles may have a higher index of refraction than a resin layer described below. In this way, the polarizing plate according to embodiments of the present invention can further improve side contrast and brightness.

In an embodiment, a difference in index of refraction between the acicular microparticles and the resin layer may be 0.8 or less, and, in an embodiment, 0.01, 0.05, 0.1, 0.15, 0.2. 0.25, 0.3, 0.35, 0.4, 0.45, 0.5, 0.55, 0.6, 0.65, 0.7, 0.75, or 0.8, and, in an embodiment, 0.5 or less, and, in an embodiment, 0.15 to 0.25. Within this range, the polarizing plate can further improve contrast and brightness while improving optical properties of the resin layer.

In an embodiment, the acicular microparticles may have an index of refraction of 1.5 to 2.2, and, in an embodiment, 1.5, 1.55, 1.6, 1.65, 1.7, 1.75, 1.8, 1.85, 1.9, 1.95, 2.0, 2.05, 2.1, 2.15, or 2.2, and, in an embodiment, 1.6 to 1.8, and, in an embodiment, 1.65 to 1.7. Within this range, the acicular microparticles can have an appropriate index of refraction relative to the resin layer described below, thereby aiding in improving contrast and visibility.

The acicular microparticles may be formed of at least one selected from among metal oxides, such as titanium oxide (for example, $TiO_2$), zirconium oxide (for example, $ZrO_2$), and zinc oxide (for example, $ZnO$), metal compounds, such as calcium carbonate ($CaCO_3$), boehmite, aluminum borate (for example, $AlBO_3$), calcium silicate (for example, $CaSiO_3$, wollastonite), magnesium sulfate ($MgSO_4$), magnesium sulfate hydrate (for example, $MgSO_4 \cdot 7H_2O$), and potassium titanate (for example, $K_2Ti_8O_{17}$), glass, and a synthetic resin. In an embodiment, the acicular microparticles are formed of calcium carbonate ($CaCO_3$) to facilitate preparation thereof and achievement of the effects of the present invention.

In an embodiment, the acicular microparticles may be incorporated into the resin layer described below without being subjected to surface modification. However, surface modification of the acicular microparticles can achieve improvement in compatibility of the acicular microparticles with the resin layer described below, which is formed of an organic material, and improvement in dispersibility of the acicular microparticles in the resin layer, thereby improving optical properties of the first optically functional layer, and can prevent or substantially prevent aggregation of the acicular microparticles, thereby facilitating achievement of the effects of the present invention. In an embodiment, the acicular microparticles may be subjected to surface modification over 50% or more, for example, 60% to 100% or 60% to 95% of the entire surface area thereof. Within this range, the acicular microparticles can have improved compatibility and dispersibility.

In an embodiment, the acicular microparticles may be subjected to surface modification with at least one selected from among a silane compound, a surfactant, and oils. In an embodiment, the acicular microparticles are surface-treated with a silane compound having a (meth)acryloyloxy group or a (meth)acrylate group to have good compatibility with a matrix of a (meth)acrylate resin layer described below and good dispersibility in the matrix.

The silane compound having the (meth)acryloyloxy group or the (meth)acrylate group may include at least one selected from among 3-(meth)acryloyloxypropylmethyldimethoxysilane, 3-(meth)acryloyloxypropyltrimethoxysilane, 3-(meth)acryloyloxypropylmethyldiethoxysilane, 3-(meth)acryloyloxypropyltriethoxysilane, and 3-(meth)acryloyloxypropyltrimethoxysilane, and, in an embodiment, at least one selected from among 3-(meth)acryloyloxypropyltrimethoxysilane and 3-(meth)acryloyloxypropyltriethoxysilane.

In an embodiment, a difference in index of refraction between the surface-modified acicular microparticles and the resin layer may be 0.8 or less, and, in an embodiment, 0.01, 0.05, 0.1, 0.15, 0.2. 0.25, 0.3, 0.35, 0.4, 0.45, 0.5, 0.55, 0.6, 0.65, 0.7, 0.75, or 0.8, and, in an embodiment, 0.5 or less, and, in an embodiment, 0.15 to 0.25. Within this range, the polarizing plate can further improve contrast and brightness while improving optical properties of the resin layer.

In an embodiment, the surface-modified acicular microparticles may have an index of refraction of 1.5 to 2.2, and, in an embodiment, 1.5, 1.55, 1.6, 1.65, 1.7, 1.75, 1.8, 1.85, 1.9, 1.95, 2.0, 2.05, 2.1, 2.15, or 2.2, and, in an embodiment, 1.6 to 1.8, and, in an embodiment, 1.65 to 1.7. Within this range, the acicular microparticles can have an appropriate index of refraction relative to the resin layer described below, thereby aiding in improving contrast and visibility.

In an embodiment, the acicular microparticles may be present in an amount of 1 wt % to 30 wt %, for example, 1 wt %, 2 wt %, 3 wt %, 4 wt %, 5 wt %, 6 wt %, 7 wt %, 8 wt %, 9 wt %, 10 wt %, 11 wt %, 12 wt %, 13 wt %, 14 wt %, 15 wt %, 16 wt %, 17 wt %, 18 wt %, 19 wt %, 20 wt %, 21 wt %, 22 wt %, 23 wt %, 24 wt %, 25 wt %, 26 wt %, 27 wt %, 28 wt %, 29 wt %, or 30 w %, and, in an embodiment, 4 wt % to 15 wt %, in the first optically functional layer. Within this range, the polarizing plate can achieve improvement in contrast and brightness. If the acicular microparticles are present in an excessive amount in the first optically functional layer, this can cause increase in haze.

The acicular microparticles may be disposed at an outermost portion of the upper surface of the first optically functional layer or at an outermost portion of the lower surface of the first optically functional layer. In an embodiment, the acicular microparticles are uniformly or substantially uniformly dispersed in the first optically functional layer, and, in an embodiment, in the resin layer described below.

In an embodiment, the acicular microparticles may be impregnated into the resin layer to form the first optically functional layer 20.

The first optically functional layer 20, specifically, the resin layer, may be interposed between the first protective layer 30 and the second protective layer 40, and may also serve as an adhesive layer adhesively bonding the first protective layer 30 to the second protective layer 40. However, it is to be understood that the present invention is not limited thereto and, in an embodiment in which the second protective layer is omitted, the resin layer may adhesively bond the first protective layer to the polarizer. In another embodiment, the first optically functional layer 20, specifically, the resin layer, may be a non-adhesive layer.

In an embodiment, the resin layer has a glass transition temperature (Tg) of −70° C. to −15° C. and a storage modulus of $1 \times 10^{-3}$ MPa to $9 \times 10^{-1}$ MPa at 25° C. Within these ranges of glass transition temperature and storage modulus 25° C., the first optically functional layer, specifically, the resin layer, can have sufficient interlayer peel strength to adhesively bond the first protective layer to the second protective layer (or the polarizer). In addition, within these ranges of glass transition temperature and storage modulus at 25° C., the resin layer can reduce curling of the polarizing plate due to stacking of different stack structures on the opposite surfaces of the polarizer.

In an embodiment, the resin layer may have a glass transition temperature of −70° C., −69° C., −68° C., −67° C., −66° C., −65° C., −64° C., −63° C., −62° C., −61° C., −60° C., −59° C., −58° C., −57° C., −56° C., −55° C., −54° C., −53° C., −52° C., −51° C., −50° C., −49° C., −48° C., −47° C., −46° C., −45° C., −44° C., −43° C., −42° C., −41° C., −40° C., −39° C., −38° C., −37° C., −36° C., −35° C., −34° C., −33° C., −32° C., −31° C., −30° C., −29° C., −28° C., −27° C., −26° C., −25° C., −24° C., −23° C., −22° C., −21° C., −20° C., −19° C., −18° C., −17° C., −16° C., or −15° C., and, in an embodiment, −65° C. to −15° C., and a storage modulus at 25° C. of $1 \times 10^{-3}$ MPa, $2 \times 10^{-3}$ MPa, $3 \times 10^{-3}$ MPa, $4 \times 10^{-3}$ MPa, $5 \times 10^{-3}$ MPa, $6 \times 10^{-3}$ MPa, $7 \times 10^{-3}$ MPa, $8 \times 10^{-3}$ MPa, $9 \times 10^{-3}$ MPa, $1 \times 10^{-2}$ MPa, $2 \times 10^{-2}$ MPa, $3 \times 10^{-2}$ MPa, $4 \times 10^{-2}$ MPa, $5 \times 10^{-2}$ MPa, $6 \times 10^{-2}$ MPa, $7 \times 10^{-2}$ MPa, $8 \times 10^{-2}$ MPa, $9 \times 10^{-2}$ MPa, $1 \times 10^{-1}$ MPa, $2 \times 10^{-1}$ MPa, $3 \times 10^{-1}$ MPa, $4 \times 10^{-1}$ MPa, $5 \times 10^{-1}$ MPa, $6 \times 10^{-1}$ MPa, $7 \times 10^{-1}$ MPa, $8 \times 10^{-1}$ MPa, or $9 \times 10^{-1}$ MPa, and, in an embodiment, $1 \times 10^{-2}$ MPa to $5 \times 10^{-1}$ MPa or $1 \times 10^{-1}$ MPa to $5 \times 10^{-1}$ MPa.

In an embodiment, the first optically functional layer may have a peel strength of 600 gf/25 mm or more, and, in an embodiment, 600 gf/25 mm, 650 gf/25 mm, 700 gf/25 mm, 750 gf/25 mm, 800 gf/25 mm, 850 gf/25 mm, or 900 gf/25 mm, for example, 600 gf/25 mm to 900 gf/25 mm, as measured with respect to a PET film. Within this range, the polarizing plate can have good properties in terms of reliability and delamination resistance.

The resin layer may be formed of a resin layer composition including a resin that can implement the specified glass transition temperature and storage modulus range at 25° C. while having adhesive properties. In an embodiment, the resin includes a non-birefringent resin in order not to adversely affect improvement in contrast and brightness by the acicular microparticles. Thus, the resin layer may also have no birefringence. For example, the resin may include a (meth)acrylate resin and a polyester resin, and, in an embodiment, a (meth)acrylate resin.

In an embodiment, the resin layer may be formed of a resin layer composition including a thermosetting resin.

In an embodiment, the resin layer may be formed of a composition for a thermosetting resin layer.

The specified glass transition temperature and storage modulus range at 25° C. of the resin layer may be implemented by a typical method known to those skilled in the art. For example, the specified glass transition temperature and storage modulus range at 25° C. of the resin layer may be implemented through adjustment of the glass transition temperature of the resin, the amount of a curing agent, and the type and/or amount of monomers, described below.

In an embodiment, the resin layer may have an index of refraction of 1.4 to 1.6, and, in an embodiment, 1.4, 1.43, 1.45, 1.47, 1.49, 1.5, 1.53, 1.55, 1.57, 1.59, or 1.6, and, in an embodiment, 1.45 to 1.57, and, in an embodiment, 1.47 to 1.50. Within this range, the polarizing plate can further improve contrast and brightness.

Next, a resin layer composition including a (meth)acrylate resin will be described.

The (meth)acrylate resin may be formed of a monomer mixture including an alkyl group-containing (meth)acrylic monomer; and a crosslinkable functional group-containing (meth)acrylic monomer including at least one selected from among a hydroxyl group-containing (meth)acrylic monomer, a carboxyl group-containing (meth)acrylic monomer, an amine group-containing (meth)acrylic monomer, an alicyclic group-containing (meth)acrylic monomer, and a heteroalicyclic group-containing (meth)acrylic monomer.

The alkyl group-containing (meth)acrylic monomer may include unsubstituted $C_1$ to $C_{10}$ alkyl group-containing (meth)acrylic acid esters. In an embodiment, the alkyl group-containing (meth)acrylic monomer may include at least one selected from among methyl (meth)acrylate, ethyl (meth)acrylate, propyl (meth)acrylate, n-butyl (meth)acrylate, t-butyl (meth)acrylate, isobutyl (meth)acrylate, pentyl (meth)acrylate, hexyl (meth)acrylate, 2-ethylhexyl (meth)acrylate, heptyl (meth)acrylate, octyl (meth)acrylate, isooctyl (meth)acrylate, nonyl (meth)acrylate, and decyl (meth)acrylate, without being limited thereto. These may be used alone or as a mixture thereof.

The hydroxyl group-containing (meth)acrylic monomer may include at least one selected from among a (meth)acrylic monomer having a $C_1$ to $C_{20}$ alkyl group with at least one hydroxyl group, a (meth)acrylic monomer having a $C_3$ to $C_{20}$ cycloalkyl group with at least one hydroxyl group, and a (meth)acrylic monomer having a $C_6$ to $C_{20}$ aromatic group with at least one hydroxyl group. In an embodiment, the hydroxyl group-containing (meth)acrylic monomer is a (meth)acrylic monomer having a $C_1$ to $C_{20}$ alkyl group with at least one hydroxyl group, and may include at least one selected from among 2-hydroxyethyl (meth)acrylate, 2-hydroxypropyl (meth)acrylate, 2-hydroxybutyl (meth)acrylate, 4-hydroxybutyl (meth)acrylate, 6-hydroxyhexyl (meth) acrylate, and 1-chloro-2-hydroxypropyl (meth)acrylate. These may be used alone or as a mixture thereof.

The carboxyl group-containing (meth)acrylic monomer may include (meth)acrylic acids.

The amine group-containing (meth)acrylic monomer may include aminoalkyl (meth)acrylates.

The (meth)acrylate resin may be prepared from the monomer mixture by a typical polymerization method known to those skilled in the art. For example, the (meth)acrylate resin may be prepared by solution polymerization, suspension polymerization, or the like.

In an embodiment, the (meth)acrylate resin may have a glass transition temperature of −70° C. to −15° C., and, in an embodiment, −65° C. to −15° C. Within this range, the specified glass transition temperature of the resin layer can be easily implemented.

The resin layer composition may further include a curing agent that can cure the resin. The curing agent allows the resin layer to have adhesive properties while allowing easy implementation of the specified glass transition temperature and storage modulus at 25° C. of the resin layer.

In an embodiment, the curing agent may include at least one selected from among an isocyanate curing agent, an epoxy curing agent, an aziridine curing agent, a carbodiimide curing agent, and a metal chelate curing agent.

The isocyanate curing agent may include a bi- or higher functional, for example, a bifunctional to hexafunctional isocyanate curing agent. In an embodiment, the isocyanate curing agent may include: an alicyclic group-containing isocyanate curing agent, such as isophorone diisocyanate (IPDI); a trifunctional isocyanate curing agent, such as a trifunctional trimethylolpropane-modified toluene diisocyanate adduct, a trifunctional toluene diisocyanate trimer, and a trimethylolpropane-modified xylene diisocyanate adduct; hexafunctional trimethylolpropane-modified toluene diisocyanate; and hexafunctional isocyanurate-modified toluene diisocyanate. In an embodiment, the alicyclic group-containing isocyanate curing agent is used as the isocyanate curing agent to facilitate adjustment of the index of refraction of the resin layer.

In an embodiment, the curing agent may be present in an amount of 0.1 parts by weight to 10 parts by weight, for example 0.1, 0.2, 0.3, 0.4, 0.5, 0.6, 0.7, 0.8, 0.9, 1, 1.1, 1.2, 1.3, 1.4, 1.5, 1.6, 1.7, 1.8, 1.9, 2, 2.1, 2.2, 2.3, 2.4, 2.5, 2.6, 2.7, 2.8, 2.9, 3, 3.1, 3.2, 3.3, 3.4, 3.5, 3.6, 3.7, 3.8, 3.9, 4, 4.1, 4.2, 4.3, 4.4, 4.5, 4.6, 4.7, 4.8, 4.9, 5, 5.5, 6, 6.5, 7, 7.5, 8, 8.5, 9, 9.5, or 10 parts by weight, and, in an embodiment, 0.2 parts by weight to 5 parts by weight, relative to 100 parts by weight of the (meth)acrylate resin. Within this range, the resin layer can easily have adhesive properties.

Besides the (meth)acrylate resin and the curing agent, the resin layer composition may further include various additives.

In an embodiment, the resin layer composition may further include a dispersant to facilitate dispersion of the acicular microparticles. The dispersant may include a typical dispersant known to those skilled in the art, for example, DISPERBYK 180 (alkylol ammonium salt of copolymer with acidic groups) or the same series of dispersants, without being limited thereto.

In an embodiment, the first optically functional layer 20 may have a thickness of 100 μm or less, and, in an embodiment, 5 μm, 10 μm, 15 μm, 20 μm, 25 μm, 30 μm, 35 μm, 40 μm, 45 μm, 50 μm, 55 μm, 60 μm, 65 μm, 70 μm, 75 μm, 80 μm, 85 μm, 90 μm, 95 μm, or 100 μm, and, in an embodiment, less than 50 μm, and, in an embodiment, 5 μm to 15 μm. Within this range, a desired hardness of the polarizing plate can be obtained.

In an embodiment, the first optically functional layer 20 may have a luminous transmittance of 90% or more, and, in an embodiment, 90%, 91%, 92%, 93%, 94%, 95%, 96%, 97%, 98%, 99%, or 100%, and, in an embodiment, 90% to 100%. In an embodiment, the first optically functional layer 20 may have a haze of 30% or less, and, in an embodiment, 0%, 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, or 30%, and, in an embodiment, 0% to 30%, and, in an embodiment, 10% to 25%. Within these ranges of luminous transmittance and haze, the first optically functional layer 20 can be used in the polarizing plate and can aid in improving contrast and brightness through reduction in white turbidity.

The first optically functional layer 20 may be formed by a method described below.

In an embodiment, the first optically functional layer 20 may be formed as a coating layer on the first protective layer 30. The first optically functional layer 20 may be formed by slot-die coating, micro-gravure coating, gap roll coating, or bar coating. In an embodiment, the orientation angles of the acicular microparticles and the standard deviation thereof specified herein may be implemented by adjusting the viscosity of a composition for the first optically functional layer (for example, to 100 cP to 400 cP at 25° C.) during formation of the composition or by adjusting the coating pressure (for example, to 0.1 mPa to 0.4 mPa at 25° C.) during coating of the first optically functional layer 20 onto the first protective layer 30, without being limited thereto. Here, the composition for the first optically functional layer may be prepared by incorporating the acicular microparticles into the resin layer composition.

Figure 6:
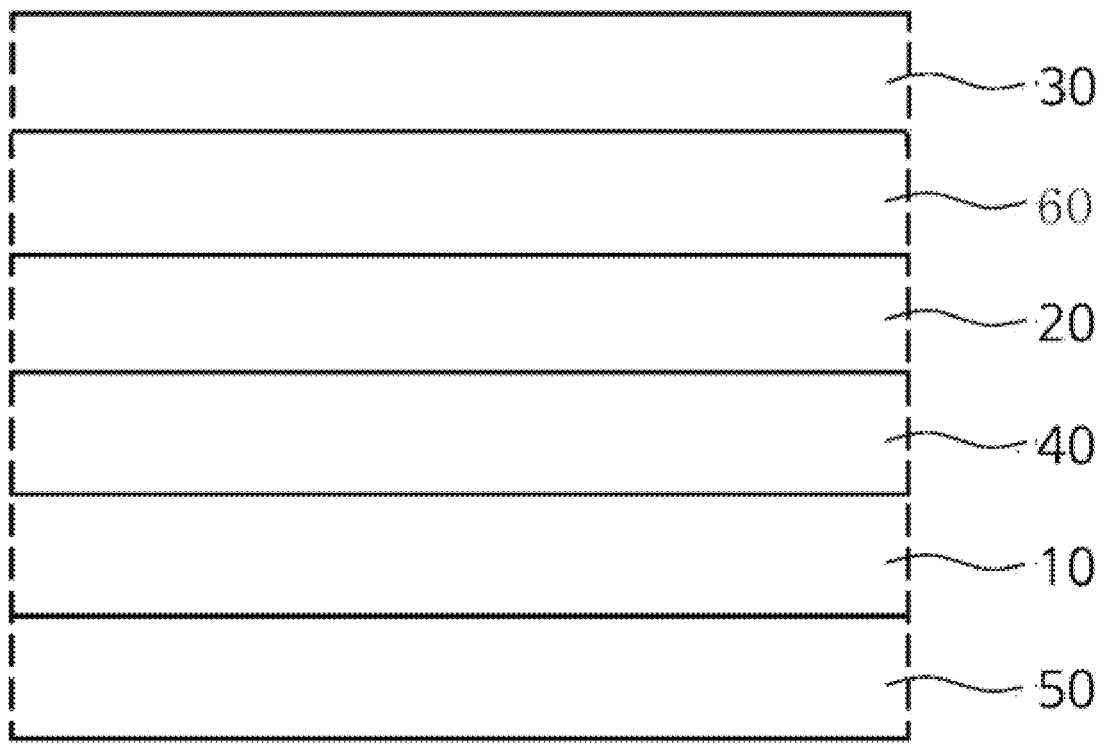
FIG. 6 is a cross-sectional view of a polarizing plate according to another embodiment of the present invention.

Referring to FIG. 6, the polarizing plate according to an embodiment of the present invention may further include a second optically functional layer 60 stacked on an upper surface of the first optically functional layer 20, that is, a light exit surface of the first optically functional layer 20 with reference to internal light of an optical display apparatus.

The second optically functional layer 60 may include: a resin layer; and acicular microparticles. With the second optically functional layer 60, the polarizing plate according to one or more embodiments of the present invention can further improve vertical and lateral visibility.

In an embodiment, the acicular microparticles may have the same length L, diameter D, and aspect ratio as the acicular microparticles of the first optically functional layer 20. In addition, a difference in index of refraction between the acicular microparticles and the resin layer, a range of indexes of refraction of the acicular microparticles, and an amount of the acicular microparticles in the second optically functional layer 60 may be the same as described with regard to the acicular microparticles of the first optically functional layer 20.

In an embodiment, the acicular microparticles of the second optically functional layer 60 may have a longitudinal direction substantially orthogonal to the longitudinal direction of the acicular microparticles of the first optically functional layer 20. In this way, the polarizing plate according to one or more embodiments of the present invention can further improve light diffusion in the vertical and horizontal directions. Here, "substantially orthogonal" means that the longitudinal direction of the acicular microparticles of the second optically functional layer 60 forms an angle of 85° to 95°, and, in an embodiment, 90°, with respect to the longitudinal direction of the acicular microparticles of the first optically functional layer 20.

In an embodiment, the resin layer of the second optically functional layer 60 may have the same glass transition temperature and storage modulus at 25° C. as the resin layer of the first optically functional layer 20, and may be formed of substantially the same composition as the resin layer of the first optically functional layer 20.

In addition, the second optically functional layer 60 may have a thickness in the range described with respect to the first optically functional layer 20.

First Protective Layer

The first protective layer 30 may be stacked on the light exit surface of the first optically functional layer 20 with reference to internal light of an optical display apparatus, and may support the first optically functional layer 20.

In an embodiment, the first protective layer 30 may have a luminous transmittance of 90% or more, for example, 90% to 100%. Within this range, the first protective layer 30 can transmit incident light therethrough without affecting the incident light.

The first protective layer 30 may include a transparent base material. The transparent base material may have a different index of refraction than the first optically functional layer 20. The transparent base material may have a higher or lower index of refraction than the first optically functional layer 20. In an embodiment, the transparent base material has a higher index of refraction than the resin forming the first optically functional layer 20. As such, the transparent base material can aid in improving contrast and brightness.

The transparent base material may include an optically clear resin film having a light entry surface and a light exit surface opposite the light entry surface. In an embodiment, the transparent base material may consist of a single layer of the optically clear resin film. However, the present invention is not limited thereto, and the transparent base material may consist of multiple layers of the optically clear resin film. The optically clear resin film may include at least one selected from among a cellulose ester resin including triacetylcellulose (TAC) and the like, a cyclic polyolefin resin including amorphous cyclic polyolefin (COP) and the like, a polycarbonate resin, a polyester resin including polyethylene terephthalate (PET) and the like, a polyether sulfone resin, a polysulfone resin, a polyamide resin, a polyimide resin, a non-cyclic polyolefin resin, a polyacrylate resin including a poly(methyl methacrylate) resin and the like, a polyvinyl alcohol resin, a polyvinyl chloride resin, and a polyvinylidene chloride resin, without being limited thereto. In an embodiment, the transparent base material includes a polyester resin including polyethylene terephthalate (PET) and the like to further improve contrast and brightness.

Although the transparent base material may be a non-stretched film, the present invention is not limited thereto, and the transparent base material may be a retardation film or an isotropic optical film, which is obtained by stretching the resin by a predetermined method and has a certain range of retardation.

In an embodiment, the transparent base material may be an isotropic optical film having an Re of 0 nm to 60 nm, and, in an embodiment, 40 nm to 60 nm. Within this range, the transparent base material can provide good image quality through compensation for viewing angle. Herein, the "isotropic optical film" refers to a film in which nx, ny, and nz (nz being an out-of-plane index of refraction at a wavelength of 550 nm) have substantially the same value. Here, the expression "substantially the same" includes not only a case in which nx, ny, and nz have exactly the same value, but also a case in which nx, ny, and nz have insignificantly different values.

In another embodiment, the transparent base material may be a retardation film having an Re of 60 nm or more. For example, the transparent base material may have an Re of 60 nm to 500 nm, or 60 nm to 300 nm. For example, the transparent base material may have an Re of 6,000 nm or more, or 8,000 nm or more, and, in an embodiment, 10,000 nm or more, and, in an embodiment, greater than 10,000 nm, and, in an embodiment, 10,100 nm to 30,000 nm, or 10,100 nm to 15,000 nm. Within this range, the transparent base material can prevent or substantially prevent appearance of Moiré patterns while further enhancing improvement in contrast and visibility by light diffused through the first resin layer.

In an embodiment, the transparent base material may have a haze of 30% or less, and, in an embodiment, 2% to 30%. Within this range, the transparent base material can be used in the polarizing plate.

In an embodiment, the transparent base material may have a thickness of 5 μm to 200 μm, for example 30 μm to 120 μm. Within this range, the transparent base material can be used in the polarizing plate.

Besides the transparent base material, the first protective layer 30 may further include a functional layer stacked on at least one surface of the transparent base material. The functional layer may include at least one selected from among a hard coat layer, a scattering layer, a low reflectivity layer, an ultra-low reflectivity layer, a primer layer, a fingerprint-resistant layer, an antireflection layer, and an antiglare layer.

In an embodiment, the first protective layer 30 includes an antireflection layer as the functional layer. In an embodiment, the first protective layer 30 may have a reflectance of 5% or less, and, in an embodiment, 0.1%, 0.2%, 0.3%, 0.4%, 0.5%, 0.6%, 0.7%, 0.8%, 0.9%, 1%, 1.5%, 2%, 2.5%, 3%, 3.5%, 4%, 4.5%, or 5%, for example, 0.1% to 3%, for example, 0.2% or less. Within this range, the effects of the present invention can be more easily achieved. Here, the "reflectance" may be measured by a typical method known to those skilled in the art.

In an embodiment, the first protective layer 30 may have a haze of 30% or less, and, in an embodiment, 1% to 30%, or 2% to 20%. Within this range, the first protective layer 30 can be used in the polarizing plate and can aid in improving contrast and brightness through reduction in white turbidity.

In an embodiment, a laminate of the first optically functional layer 20 and the first protective layer 30 may have a haze of 30% or less, and, in an embodiment, 0%, 0.5%, 1%, 2%, 3%, 4%, 5%, 6%, 7%, 8%, 9%, 10%, 11%, 12%, 13%, 14%, 15%, 16%, 17%, 18%, 19%, 20%, 21%, 22%, 23%, 24%, 25%, 26%, 27%, 28%, 29%, or 30%, for example, 1% to 30%, or 2% to 20%. Within this range, the laminate of the first optically functional layer 20 and the first protective layer 30 can be used in the polarizing plate and can aid in improving contrast and visibility through reduction in white turbidity.

Polarizer

The polarizer 10 serves to polarize incoming light from a liquid crystal panel and transmit the polarized light to the first optically functional layer 20. The polarizer 10 may be stacked on the light entry surface of the first optically functional layer 20 with reference to internal light of an optical display apparatus.

In an embodiment, the polarizer 10 may include a polyvinyl alcohol-based polarizer prepared by uniaxially stretching a polyvinyl alcohol film.

In an embodiment, the polarizer 10 may have a thickness of about 5 μm to about 40 μm. Within this range, the polarizer can be used in an optical display apparatus.

Second Protective Layer

In an embodiment, the second protective layer 40 may be stacked on a light exit surface of the polarizer 10 with reference to internal light of an optical display apparatus. That is, the second protective layer 40 may be interposed between the polarizer 10 and the first optically functional layer 20. However, the present invention is not limited thereto, and, for example, the second protective layer 40 may be omitted.

In an embodiment, the second protective layer 40 may have a luminous transmittance of 90% or more, for example, 90% to 100%. Within this range, the second protective layer 40 can transmit incident light therethrough without affecting the incident light.

The second protective layer 40 may include a transparent base material. The transparent base material may include an optically clear resin film having a light entry surface and a light exit surface opposite the light entry surface. In an embodiment, the transparent base material may consist of a single layer of the optically clear resin film. However, the present invention is not limited thereto, and, for example, the transparent base material may consist of multiple layers of the optically clear resin film. The optically clear resin film may include at least one selected from among a cellulose ester resin including triacetylcellulose (TAC) and the like, a cyclic polyolefin resin including amorphous cyclic polyolefin (COP) and the like, a polycarbonate resin, a polyester resin including polyethylene terephthalate (PET) and the like, a polyether sulfone resin, a polysulfone resin, a polyamide resin, a polyimide resin, a non-cyclic polyolefin resin, a polyacrylate resin including a poly(methyl methacrylate) resin and the like, a polyvinyl alcohol resin, a polyvinyl chloride resin, and a polyvinylidene chloride resin, without being limited thereto. In an embodiment, the transparent base material includes a cyclic polyolefin resin including amorphous cyclic polyolefin (COP) and the like.

Although the transparent base material may be a non-stretched film, the present invention is not limited thereto, and the transparent base material may be a retardation film or an isotropic optical film which is obtained by stretching the resin by a predetermined method and has a certain range of retardation.

In an embodiment, the transparent base material may be an isotropic optical film having an Re of 0 nm to 60 nm, and, in an embodiment, 40 nm to 60 nm. Within this range, the transparent base material can provide good image quality through compensation for viewing angle. Herein, the "isotropic optical film" refers to a film in which nx, ny, and nz (nz being an out-of-plane index of refraction at a wavelength of 550 nm) have substantially the same value. Here, the expression "substantially the same" includes not only a case in which nx, ny, and nz have exactly the same value, but also a case in which nx, ny, and nz have insignificantly different values.

In another embodiment, the transparent base material may be a retardation film having an Re of 60 nm or more. For example, the transparent base material may have an Re of 60 nm to 500 nm, or 60 nm to 300 nm. For example, the transparent base material may have an Re of 6,000 nm or more, or 8,000 nm or more, and, in an embodiment, 10,000 nm or more, and, in an embodiment, greater than 10,000 nm, and, in an embodiment, 10,100 nm to 30,000 nm, or 10,100 nm to 15,000 nm. Within this range, the transparent base material can prevent or substantially prevent appearance of Moiré patterns while further enhancing improvement in contrast and visibility by light diffused through the first resin layer.

In an embodiment, the second protective layer 40, and, in an embodiment, the transparent base material, may have a thickness of 5 μm to 200 μm, for example, 30 μm to 120 μm. Within this range, the second protective layer 40 can be used in the polarizing plate.

However, as described above, the second protective layer 40 may be omitted from the polarizing plate according to an embodiment of the present invention.

Third Protective Layer

The third protective layer 50 may be stacked on the light entry surface of the polarizer 10 with reference to internal light of an optical display apparatus.

In an embodiment, the third protective layer 50 may have a luminous transmittance of 90% or more, for example, 90% to 100%. Within this range, the third protective layer 50 can transmit incident light therethrough without affecting the incident light.

The third protective layer 50 may include a transparent base material. The transparent base material may include an optically clear resin film having: a light entry surface; and a light exit surface opposite the light entry surface. In an embodiment, the transparent base material may consist of a single layer of the optically clear resin film. However, the present invention is not limited thereto, and the transparent base material may consist of multiple layers of the optically clear resin film. The optically clear resin film may include at least one selected from among a cellulose ester resin including triacetylcellulose (TAC) and the like, a cyclic polyolefin resin including amorphous cyclic polyolefin (COP) and the like, a polycarbonate resin, a polyester resin including polyethylene terephthalate (PET) and the like, a polyether sulfone resin, a polysulfone resin, a polyamide resin, a polyimide resin, a non-cyclic polyolefin resin, a polyacrylate resin including a poly(methyl methacrylate) resin and the like, a polyvinyl alcohol resin, a polyvinyl chloride resin, and a polyvinylidene chloride resin, without being limited thereto. In an embodiment, the transparent base material includes a cyclic polyolefin resin including amorphous cyclic polyolefin (COP) and the like.

Although the transparent base material may be a non-stretched film, the present invention is not limited thereto, and the transparent base material may be a retardation film or an isotropic optical film which is obtained by stretching the resin by a predetermined method and has a certain range of retardation.

In an embodiment, the transparent base material may be an isotropic optical film having an Re of 0 nm to 60 nm, and, in an embodiment, 40 nm to 60 nm. Within this range, the transparent base material can provide good image quality through compensation for viewing angle. Herein, the "isotropic optical film" refers to a film in which nx, ny, and nz (nz being an out-of-plane index of refraction at a wavelength of 550 nm) have substantially the same value. Here, the expression "substantially the same" includes not only a case in which nx, ny, and nz have exactly the same value, but also a case in which nx, ny, and nz have insignificantly different values.

In another embodiment, the transparent base material may be a retardation film having an Re of 60 nm or more. For example, the transparent base material may have an Re of 60 nm to 500 nm, or 60 nm to 300 nm. For example, the transparent base material may have an Re of 6,000 nm or more, or 8,000 nm or more, and, in an embodiment, 10,000 nm or more, and, in an embodiment, greater than 10,000 nm, and, in an embodiment, 10,100 nm to 30,000 nm, or 10,100 nm to 15,000 nm. Within this range, the transparent base material can prevent or substantially prevent appearance of Moiré patterns while further enhancing improvement in contrast and visibility by light diffused through the first resin layer.

In an embodiment, the third protective layer 50, and, in an embodiment, the transparent base material, may have a thickness of 5 μm to 200 μm, for example, 30 μm to 120 μm. Within this range, the third protective layer 50 can be used in the polarizing plate.

However, the third protective layer 50 may be omitted from the polarizing plate according to an embodiment of the present invention.

An optical display apparatus according to one or more embodiments of the present invention includes the polarizing plate according to an embodiment of the present invention.

In an embodiment, an optical display apparatus may include the polarizing plate as a viewer-side polarizing plate. Here, the "viewer-side polarizing plate" refers to a polarizing plate disposed on the side of a screen of the optical display apparatus with respect to a liquid crystal panel, that is, disposed opposite a light source of the optical display apparatus.

In an embodiment, the liquid crystal display may include a condensing backlight unit, a light source-side polarizing plate, a liquid crystal panel, and a viewer-side polarizing plate, which are sequentially stacked, wherein the viewer-side polarizing plate may include the polarizing plate according to an embodiment of the present invention. Here, the "light source-side polarizing plate" refers to a polarizing plate disposed on the side of a light source of the optical display apparatus. The liquid crystal panel may employ a vertical alignment (VA) mode, an IPS mode, a patterned vertical alignment (PVA) mode, or a super-patterned vertical alignment (S-PVA) mode, without being limited thereto.

Next, the present invention will be described in further detail with reference to some examples. However, it is to be understood that these examples are provided for illustration and are not to be construed in any way as limiting the present invention.

Example 1

(1) A polyethylene terephthalate (PET) film (DSG-17(Z) PET80, DNP Co., Ltd., reflectance: 0.2%) having an anti-reflection layer formed on an upper surface thereof was prepared.

As acicular microparticles, a mixture of $CaCO_3$ particles (Whiscal A, MARUO CALCIUM Co., Ltd., length: 10 μm to 30 μm, diameter: 0.5 μm to 2.0 μm, index of refraction: 1.68) was prepared and added to a methyl ethyl ketone solution containing KBM503 (3-methacryloxypropyltrimethoxysilane), followed by reaction at room temperature to surface-modify the $CaCO_3$ particles with 3-methacryloxypropyltrimethoxysilane.

Then, methyl ethyl ketone and the surface-modified $CaCO_3$ particles were added to an adhesive resin (SAIDEN Chemical Industry Co., Ltd.), followed by dispersion for 4 hours using a homogenizer, and then isophorone diisocyanate was added in an amount of 0.2 parts by weight relative to 100 parts by weight of the adhesive resin, followed by stirring at 500 rpm for 15 minutes, thereby preparing a resin layer composition. Then, acicular $CaCO_3$ microparticles were incorporated into the resin layer composition, thereby preparing a composition for a first optically functional layer.

The composition for the first optically functional layer was coated onto a lower surface of the polyethylene terephthalate (PET) film (the lower surface having a primer layer formed thereon) using an applicator, followed by drying and thermal curing in a drying oven at 90° C. for 4 minutes, thereby forming a first optically functional layer (index of refraction of the surface-modified $CaCO_3$ particles: 1.68, index of refraction of the resin layer: 1.47, the surface-modified $CaCO_3$ particles being oriented in the resin layer).

(2) A polarizer (thickness: 13 μm, luminous transmittance: 44%) was prepared by stretching a polyvinyl alcohol film to 3 times an initial length thereof at 60° C., adsorbing iodine to the stretched film, and further stretching the film to 2.5 times in an aqueous solution of boric acid at 40° C.

A polyethylene terephthalate (PET) film (Toyobo, Co., Ltd., thickness: 80 μm) was bonded to an upper surface of the prepared polarizer, followed by bonding a cyclic olefin polymer (COP) film (ZEON Co., Ltd.) to a lower surface of the polarizer, thereby forming a laminate of the PET film, the polarizer, and the COP film.

(3) The first optically functional layer was laminated on the PET film of the laminate, thereby fabricating a polarizing plate in which the PET film with the antireflection layer formed thereon (a first protective layer), the first optically functional layer, the PET film (a second protective layer), the polarizer, and the COP film (a third protective layer) were stacked in the stated order. The $CaCO_3$ particles were oriented in an in-plane direction of the first optically functional layer, wherein orientation angles of the $CaCO_3$ particles had an average value of +1.2° and a standard deviation of 7.2°.

Example 2

A polarizing plate was fabricated in the same manner as in Example 1 except that the configuration of the first optically functional layer was changed as listed in Table 1.

Example 3

A polarizing plate was fabricated in the same manner as in Example 1 except that a different adhesive resin was used instead of the adhesive resin from SAIDEN Chemical Industry Co., Ltd., and the configuration of the first optically functional layer was changed as listed in Table 1.

Example 4

A polarizing plate was fabricated in the same manner as in Example 1 except that the configuration of the first optically functional layer was changed as listed in Table 1.

Examples 5 to 6

Polarizing plates were fabricated in the same manner as in Example 1 except that the configuration of the first optically functional layer was changed as listed in Table 1.

Example 7

As acicular microparticles, a mixture of $CaCO_3$ particles (Whiscal A, MARUO CALCIUM Co., Ltd., length: 10 μm to 30 μm, diameter: 0.5 μm to 2.0 μm, index of refraction: 1.68) was prepared and added to a methyl ethyl ketone solution containing a dispersant (DISPERBYK 180, alkylol ammonium salt of copolymer with acidic groups), followed by stirring under conditions of 1,000 rpm and room temperature for 2 hours. Then, a composition for a first optically functional layer was prepared using an adhesive resin and a curing agent, as in Example 1, followed by fabrication of a polarizing plate in the same manner as in Example 1.

Comparative Example 1

A polarizing plate was fabricated in the same manner as in Example 1 except that an adhesive resin (PHS210, Nippon Synthetic Chemical Industry Co., Ltd.) was used instead of the adhesive resin (SAIDEN Chemical Industry Co., Ltd.).

Comparative Example 2

A polarizing plate was fabricated in the same manner as in Example 1 except that an adhesive resin (982-S8, SAIDEN Chemical Industry Co., Ltd.) was used instead of the adhesive resin (SAIDEN Chemical Industry Co., Ltd.).

Comparative Example 3

A polarizing plate was fabricated in the same manner as in Example 1 except that isotropic spherical particles (MSP080 silicone beads, Nikko Rica Corporation, diameter: 0.8 μm) were used instead of the CaCO$_3$ particles.

Comparative Example 4

A polarizing plate was fabricated in the same manner as in Example 1 except that the configuration of the first optically functional layer was changed as listed in Table 1.

Reference Example 1

A polarizing plate was fabricated in the same manner as in Example 1 except that the first optically functional layer was omitted. That is, the polarizing plate had a structure in which a PET film, a polarizer, and a COP film were stacked in the stated order.

Using each of the polarizing plates fabricated in the Examples and Comparative Examples, a model for measurement of viewing angle was fabricated and then was evaluated as to properties shown in Table 1.
Light Source-Side Polarizing Plate A polarizer was prepared by stretching a polyvinyl alcohol film to 3 times an initial length thereof at 60° C., adsorbing iodine to the stretched film, and further stretching the film to 2.5 times in an aqueous solution of boric acid at 40° C. Then, a triacetyl cellulose film (thickness: 80 μm) as a base layer was bonded to both surfaces of the polarizer using an adhesive for polarizing plates (Z-200, Nippon Synthetic Chemical Industry Co., Ltd.), thereby fabricating a polarizing plate. The fabricated polarizing plate was used as a light source-side polarizing plate.
Viewer-Side Polarizing Plate Each of the polarizing plates fabricated in the Examples and Comparative Examples was used as a viewer-side polarizing plate.
Module for Liquid Crystal Display The light source-side polarizing plate was adhesively bonded to a lower surface of a liquid crystal panel (PVA liquid crystal mode), and then the viewer-side polarizing plate was adhesively bonded to an upper surface of the liquid crystal panel with the antireflection layer of the viewer-side polarizing plate placed farthest from the upper surface of the liquid crystal panel. Then, a backlight unit was disposed under the light source-side polarizing plate, thereby fabricating a module for liquid crystal displays.

Each of the polarizing plates fabricated in the Examples and Comparative Examples was evaluated as to the following physical properties. Results are shown in Table 1.

(1) Storage modulus of resin layer (unit: MPa): Each of the resin layer compositions of the Examples and Comparative Examples was applied to a release film to a post-drying thickness of 50 μm, followed by drying at 95° C. for 4 minutes, thereby forming a resin layer. Multiple resin layers, prepared as described above, were stacked one above another to a thickness of 500 μm and then cut into a circle with a diameter of 8 mm, thereby preparing a specimen. Storage modulus at 25° C. was measured on the prepared specimen under conditions of a heating rate of 10° C./min and a temperature range of 0° C. to 100° C. using a storage modulus measuring instrument (Advanced Rheometry Expansion System (ARES), TA Instruments).

(2) Glass transition temperature of resin layer (unit: ° C.): A resin layer was formed in the same manner as in (1), followed by preparing a 15 mg resin layer specimen (on 6 mm Al pan). Then, glass transition temperature was measured on the prepared specimen while heating the specimen to 180° C. at a heating rate of 20° C./min in a nitrogen atmosphere (50 mL/min), cooling the specimen to −100° C., and heating the specimen to 100° C. at a heating rate of 10° C./min. Here, measurement of the glass transition temperature was performed using a Discovery Hybrid Rheometer (TA Instruments).

(3) Contrast and relative contrast (unit: %): An LED light source, a light guide plate, and each of the modules for liquid crystal displays were assembled into a liquid crystal display including a single edge-type LED light source (the liquid crystal display having the same configuration as a Samsung TV (55 inch UHD TV, model number: UN55KS8000F) except for the module for liquid crystal displays fabricated using each of the polarizing plates fabricated in the Examples and Comparative Examples). Contrast of the liquid crystal display was measured from the side (corresponding to point (0°, 60°) in a spherical coordinate system) using an EZCONTRAST X88RC (EZXL-176R-F422A4, ELDIM S.A.). Here, the contrast was calculated by a ratio of brightness in white mode to brightness in black mode. In addition, relative contrast was calculated according to the following formula: relative contrast={(contrast of each of the liquid crystal displays of Examples, Comparative Examples, and Reference Example 1)/(contrast of Reference Example 1)}×100. A relative contrast of greater than 100%, specifically greater than or equal to 115%, is considered to be desirable.

(4) Pencil hardness: Each of the polarizing plates fabricated in the Examples and Comparative Examples was laminated on a glass plate, and then pencil hardness was measured on a surface of the antireflection layer using a pencil hardness tester (CT-PC2, Coatech Ltd.) in accordance with ASTM D3502.

(5) Peel strength (unit: gf/25 mm): Each of the polarizing plates fabricated in the Examples and Comparative Examples was cut to a size of 150 mm×25 mm (MD×TD of the polarizer) and then laminated on a glass plate through an acrylic adhesive layer, thereby preparing a specimen. Then, peel strength between the first protective layer and the second protective layer was measured on the specimen using a peel strength measuring instrument (texture analyzer TA-XT Plus, Stable Micro System Ltd.). Here, the peel strength was measured under conditions of a peeling temperature of 25° C., a peeling angle 180°, and a peeling rate of 300 mm/min.

6) Average and standard deviation of orientation angles: Each of the compositions for the first optically functional layer prepared in the Examples and Comparative Examples was coated onto a PET film at a rate of 6 mpm using an applicator, followed by drying at 90° C. for 4 minutes, thereby forming a first optically functional layer. Then, a surface image of the first optically functional layer was captured using an optical microscope (Olympus MX61L, magnification: 500× (10×50)) adjusted in height to be focused on the surface of the first optically functional layer, followed by executing the FIJI program (Method: Fourier Components, N bis: 90°, histogram start: 0°, histogram end:180°), thereby obtaining the average and standard deviation of orientation angles of the microparticles in the first optically functional layer.

As shown in Table 1, despite not including an optical pattern or a patterned layer including an optical pattern, the polarizing plate according to embodiments of the present invention could provide improved contrast, as compared with the polarizing plate of Reference Example 1 not including the optically functional layer according to the present invention. In addition, the polarizing plate according to the present invention could provide improved contrast, as compared with the polarizing plate of Comparative Examples 3, including spherical microparticles, and the polarizing plate of Comparative Examples 4, in which the average of the orientation angles was outside the range specified herein. Further, the polarizing plate according to the present invention exhibited good interlayer peel strength and reliability, as compared with the polarizing plates of Comparative Examples 1 and 2.

By contrast, the polarizing plates of the Comparative Examples, not satisfying the requirements specified herein, could not provide all the advantageous effects of the present invention.

While some embodiments have been described herein, it is to be understood that various modifications, changes,

TABLE 1

| | | Example | | | | | | |
|---|---|---|---|---|---|---|---|---|
| | | 1 | 2 | 3 | 4 | 5 | 6 | 7 |
| Particles First Optically functional layer | Shape | Acicular | Acicular | Acicular | Acicular | Acicular | Acicular | Acicular |
| | Thickness | 10 | 15 | 10 | 15 | 10 | 10 | 10 |
| | Concentration of particles (wt %) | 10 | 10 | 10 | 10 | 10 | 10 | 10 |
| | Average value of orientation angles | +1.2° | +1.3° | −1.2° | +2.3° | +4.0° | −3.0° | +1.2° |
| | Standard deviation of orientation angles | 7.2° | 7.8° | 5.8° | 6.9° | 6.9° | 8.1° | 7.2° |
| Resin layer | Modulus (MPa) | $7 \times 10^{-2}$ | $7 \times 10^{-2}$ | $5 \times 10^{-1}$ | $5 \times 10^{-1}$ | $7 \times 10^{-2}$ | $7 \times 10^{-2}$ | $7 \times 10^{-2}$ |
| | Glass transition temperature (° C.) | −61 | −61 | −65 | −65 | −60 | −60 | −61 |
| Contrast | | 316.1 | 321.4 | 314.6 | 322.1 | 319.6 | 317.1 | 316.1 |
| Relative contrast | | 115 | 117 | 114 | 117 | 116 | 115 | 115 |
| Pencil hardness | | 4 times | 3 times | 4 times | 3 times | 4 times | 4 times | 4 times |
| Peel strength | | 610 | 750 | 720 | 830 | 610 | 610 | 610 |

| | | Comparative Example | | | | Reference Example |
|---|---|---|---|---|---|---|
| | | 1 | 2 | 3 | 4 | 1 |
| Particles First Optically functional layer | Shape | Acicular | Acicular | Spherical | Acicular | — |
| | Thickness | 10 | 10 | 10 | 10 | — |
| | Concentration of particles (wt %) | 10 | 10 | 10 | 10 | — |
| | Average value of orientation angles | 0 | 0 | — | 90° | — |
| | Standard deviation of orientation angles | 6.2° | 6.8° | — | 7.2° | — |
| Resin layer | Modulus (MPa) | $2 \times 10^{0}$ | $1.3 \times 10^{0}$ | $7 \times 10^{-2}$ | $7 \times 10^{-2}$ | — |
| | Glass transition temperature (° C.) | −5 | −12.4 | −61 | −61 | — |
| Contrast | | 316.5 | 311.5 | 270.1 | 240.4 | 98 |
| Relative contrast | | 115 | 113 | 98 | 87 | 100 |
| Pencil hardness | | 4 times | 5 times | 4 times | 4 times | — |
| Peel strength | | 388 | 120 | 610 | 610 | — |

What is claimed is:

1. A polarizing plate comprising:
a polarizer; and
a first optically functional layer and a first protective layer sequentially stacked on a surface of the polarizer,
wherein the first optically functional layer comprises a resin layer and acicular microparticles,
the resin layer having a glass transition temperature (Tg) of $-70°$ C. to $-15°$ C. and a storage modulus of $1\times10^{-3}$ MPa to $9\times10^{-1}$ MPa at $25°$ C., and
the acicular microparticles being oriented in an in-plane direction of the first optically functional layer, and
when a light absorption axis of the polarizer is 0°, orientation angles of longitudinal directions of the acicular microparticles with respect to the light absorption axis of the polarizer have an average value of $-10°$ to $+10°$ and a standard deviation of 15° or less.

2. The polarizing plate according to claim 1, wherein the first optically functional layer comprises a contrast or brightness-enhancing layer.

3. The polarizing plate according to claim 1, wherein the acicular microparticles have an average aspect ratio of 5 to 60.

4. The polarizing plate according to claim 1, wherein the acicular microparticles have a length of 10 μm to 30 μm and a diameter of 0.5 μm to 2 μm.

5. The polarizing plate according to claim 1, wherein the acicular microparticles have a higher index of refraction than the resin layer.

6. The polarizing plate according to claim 1, wherein the acicular microparticles comprise particles formed of at least one selected from among titanium oxide, zirconium oxide, zinc oxide, calcium carbonate, boehmite, aluminum borate, calcium silicate, magnesium sulfate, magnesium sulfate hydrate, potassium titanate, glass, and a synthetic resin.

7. The polarizing plate according to claim 1, wherein a surface of the acicular microparticles is modified.

8. The polarizing plate according to claim 7, wherein the surface of the acicular microparticles is modified with at least one selected from among a silane coupling agent, a surfactant, and oils.

9. The polarizing plate according to claim 1, wherein the acicular microparticles are present in an amount of 1 wt % to 30 wt % in the first optically functional layer.

10. The polarizing plate according to claim 1, wherein the resin layer is an adhesive layer.

11. The polarizing plate according to claim 1, wherein the resin layer is formed of a composition comprising a non-birefringent resin.

12. The polarizing plate according to claim 11, wherein the non-birefringent resin comprises at least one selected from among a (meth)acrylate resin and a polyester resin.

13. The polarizing plate according to claim 11, wherein the composition further comprises a curing agent.

14. The polarizing plate according to claim 1, wherein the first optically functional layer has a thickness of 100 μm or less.

15. The polarizing plate according to claim 1, wherein the first protective layer comprises a retardation film.

16. The polarizing plate according to claim 15, wherein the first protective layer further comprises a functional layer comprising at least one selected from among a hard coat layer, a scattering layer, a low reflectivity layer, an ultra-low reflectivity layer, a primer layer, a fingerprint-resistant layer, an antireflection layer, and an antiglare layer.

17. The polarizing plate according to claim 1, further comprising a second optically functional layer between the first optically functional layer and the first protective layer.

18. The polarizing plate according to claim 17, wherein the second optically functional layer comprises a resin layer and acicular microparticles.

19. The polarizing plate according to claim 18, wherein longitudinal directions of the acicular microparticles of the second optically functional layer form an angle of 85° to 95° with respect to the longitudinal directions of the acicular microparticles in the first optically functional layer.

20. An optical display apparatus comprising the polarizing plate according to claim 1.

* * * * *